(12) United States Patent
Liu

(10) Patent No.: US 7,517,451 B2
(45) Date of Patent: Apr. 14, 2009

(54) FILTER FOR DRINKING WATER

(76) Inventor: Chih Chou Liu, No. 76, Wansing Street, Sanmin District, Kaohsiung (TW) 807

(\*) Notice: Subject to any disclaimer, the term of this patent is extended or adjusted under 35 U.S.C. 154(b) by 502 days.

(21) Appl. No.: 11/341,450

(22) Filed: Jan. 30, 2006

(65) Prior Publication Data

US 2007/0175811 A1    Aug. 2, 2007

(51) Int. Cl.
- *B01D 35/06* (2006.01)
- *B03C 1/02* (2006.01)
- *B03C 1/30* (2006.01)

(52) U.S. Cl. .................. 210/223; 210/222; 210/695; 210/335; 210/264; 210/502.1; 210/323.1; 210/295

(58) Field of Classification Search ............. 210/223, 210/259, 322, 323.1, 335, 263, 264, 266, 210/290, 294, 300.1, 502.1, 510.1, 503–508
See application file for complete search history.

(56) References Cited

U.S. PATENT DOCUMENTS

| | | | | |
|---|---|---|---|---|
| 2,678,729 A | * | 5/1954 | Spodig | 210/222 |
| 5,269,919 A | * | 12/1993 | von Medlin | 210/256 |
| 5,527,451 A | * | 6/1996 | Hembree et al. | 210/88 |
| 5,714,063 A | * | 2/1998 | Brunsting | 210/222 |
| 5,830,360 A | * | 11/1998 | Mozayeni | 210/651 |
| 6,464,884 B1 | * | 10/2002 | Gadgil | 210/748 |
| 2003/0196946 A1 | * | 10/2003 | Denzer | 210/223 |
| 2005/0121387 A1 | * | 6/2005 | Kuennen et al. | 210/503 |
| 2006/0266691 A1 | * | 11/2006 | Cheng | 210/266 |

\* cited by examiner

*Primary Examiner*—Tony G Soohoo
*Assistant Examiner*—David C Mellon
(74) *Attorney, Agent, or Firm*—Bacon & Thomas, PLLC

(57) ABSTRACT

The present invention provides a filter for drinking water, including six filtering bottles. The fifth filtering bottle is formed with ion exchange resins, and the sixth filtering bottle is formed with a ceramic filtering core. The arrangement of the original third and fourth filtering bottles of the prior art is transposed, and a device for preventing a magnet of the filter from rusting is provided. The filtering bottles are orderly in turns and connected by tubes, and the fourth filtering bottle is connected with the fifth and sixth filtering bottles by a three-way pipe. Water is poured into a first filtering bottle and discharged from the fifth or sixth filtering bottle.

7 Claims, 6 Drawing Sheets

FILTER FOR DRINKING WATER

FIELD OF THE INVENTION

The present invention relates to a filter for drinking water, and more particularly to a filter for drinking water which can filter mineral substances and different kinds of bacteria.

BACKGROUND OF THE INVENTION

FIG. 1 is an illustrative view of a conventional filter for drinking water; water is poured into a left inlet tube 11 through a first filtering bottle 1, a second filtering bottle 2, an original third filtering bottle 3' and an original fourth filtering bottle 4', and discharged from a right outlet tube 41' for drinking.

The filtering core of the first filtering bottle 1 is nonwoven in order to filter silt, rust, plankton and the like.

The second filtering bottle 2 is formed with a ceramic filtering core, which can filter the bacteria in the water such as colon bacillus.

The original third filtering bottle 3' includes a compressed active carbon filtering core and a special alloy of copper and zinc (sold under the trademark KDF 55) for filtering chlorine, chemical poisons, pesticides, heavy metal and the like.

The original fourth filtering bottle 4' is formed with an activated energy transformer, which is filled with different kinds of minerals that can radiate far infrared in order to activate the water with energy of far infrared. A magnet can be added to the original fourth filtering bottle 4' for magnetizing the water.

However, the conventional filter for drinking water still has some disadvantages as follows:

Firstly, the magnet that is added to the original fourth filtering bottle 4' will be rusted because it is dipped in the water, thereby the magnetism of the magnet will be reduced and the water will not be magnetized efficiently.

Secondly, the different kinds of minerals that are added to the original fourth filtering bottle 4' will breed bacteria easily. The water therefore becomes contaminated without a subsequent filter to filter the bacteria.

Thirdly, the different kinds of minerals that are added to the original fourth filtering bottle 4' will produce many mineral substances when dissolved in the water, and beverages made with this water will be contaminated with these mineral substances (e.g., calcium and magnesium). For instance, tea made with this water will be contaminated with calcium carbonate and magnesium carbonate.

The present invention has arisen to mitigate and/or obviate the afore-described disadvantages.

SUMMARY OF THE INVENTION

The primary objective of the present invention is to provide a filter for drinking water that can filter mineral substances and different kinds of bacteria in the water. The arrangement of the original third and fourth filtering bottle is transposed. A device for preventing the magnet from rusting is added and bacteria is restrained by silver elements in compressed active carbons. In addition, a fifth filtering bottle is defined with ion exchange resins for filtering mineral substances in the water, and a sixth filtering bottle is defined with hollow silk films or a ceramic filtering core for further filtering bacteria in the water.

The filtering bottles are orderly in turns and connected by tubes, the fourth filtering bottle is connected with the fifth and sixth filtering bottle by a three-way pipe. Water is poured into the first filtering bottle and discharged from the fifth or sixth filtering bottle.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
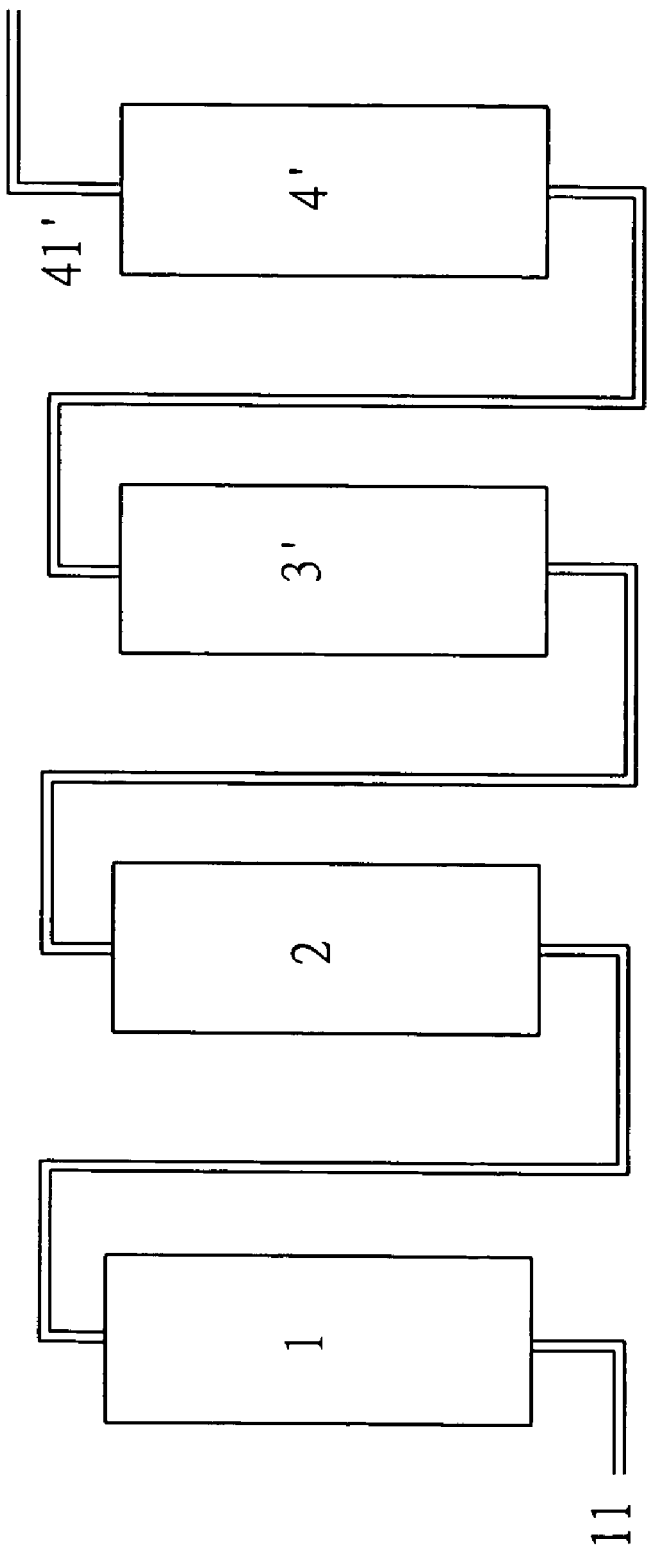
FIG. 1 is an illustrative view of an ordinary filter for drinking water.
Figure 2:
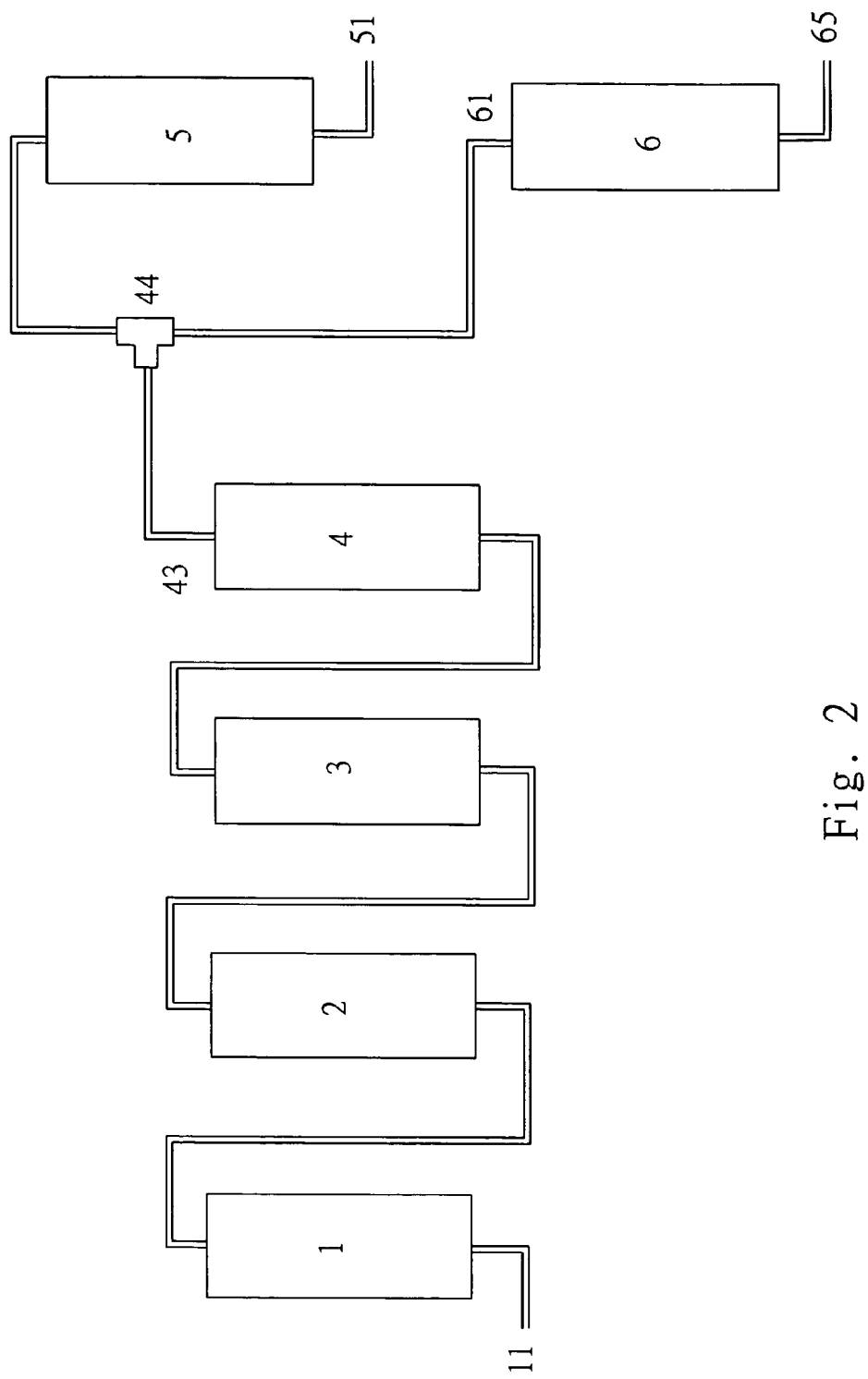
FIG. 2 is an illustrative view of a filter for drinking water in accordance with the present invention.

FIG. 2 is an illustrative view of a filter for drinking water in accordance with the present invention, wherein water is poured into a left inlet tube 11 through a first filtering bottle 1, a second filtering bottle 2, a third filtering bottle 3 and a fourth filtering bottle 4 and discharged from a tube 43, and then divided into two paths when passed into a three-way pipe 44; one way is connected with a fifth filtering bottle 5, and the other is connected with a sixth filtering bottle 6. Water is discharged either from a right outlet tube 51 associated with the fifth filtering bottle, or a right outlet tube 65 associated with the sixth filtering bottle.

The filtering core of the first filtering bottle 1 is nonwoven in order to filter the silt, rust, plankton and the like.

The second filtering bottle 2 is formed with a ceramic filtering core, which can filter bacteria, such as colon bacillus.

An activated energy transformer is formed in the third filtering bottle 3 as shown in FIG. 3(a), which is divided into an upper layer and a lower layer. The lower layer 31 is filled with different kinds of minerals that can radiate far infrared in order to activate the water with far infrared energy. The minerals are maintained in the lower layer by a filtering net 34. The upper layer 32 has a magnetic cylinder 321.

Referring to FIG. 3(b), the magnetic cylinder 321 is made of plastics, in the middle of the magnetic cylinder 321 is formed a flowing water passage 3211, two cuboid magnets 3213, 3214, and two semicircle iron posts 3212, 3215 are defined at the sides of the flowing water passage 3211 and are wrapped by plastic materials. The water is poured into the lower layer 31 through the flowing water passage 3211 and discharged from a tube 33. The cuboid magnets 3213, 3214 and the semicircle iron posts 3212, 3215 will not be rusted since they do not contact the water, therefore the water will not be contaminated.

Figure 3:
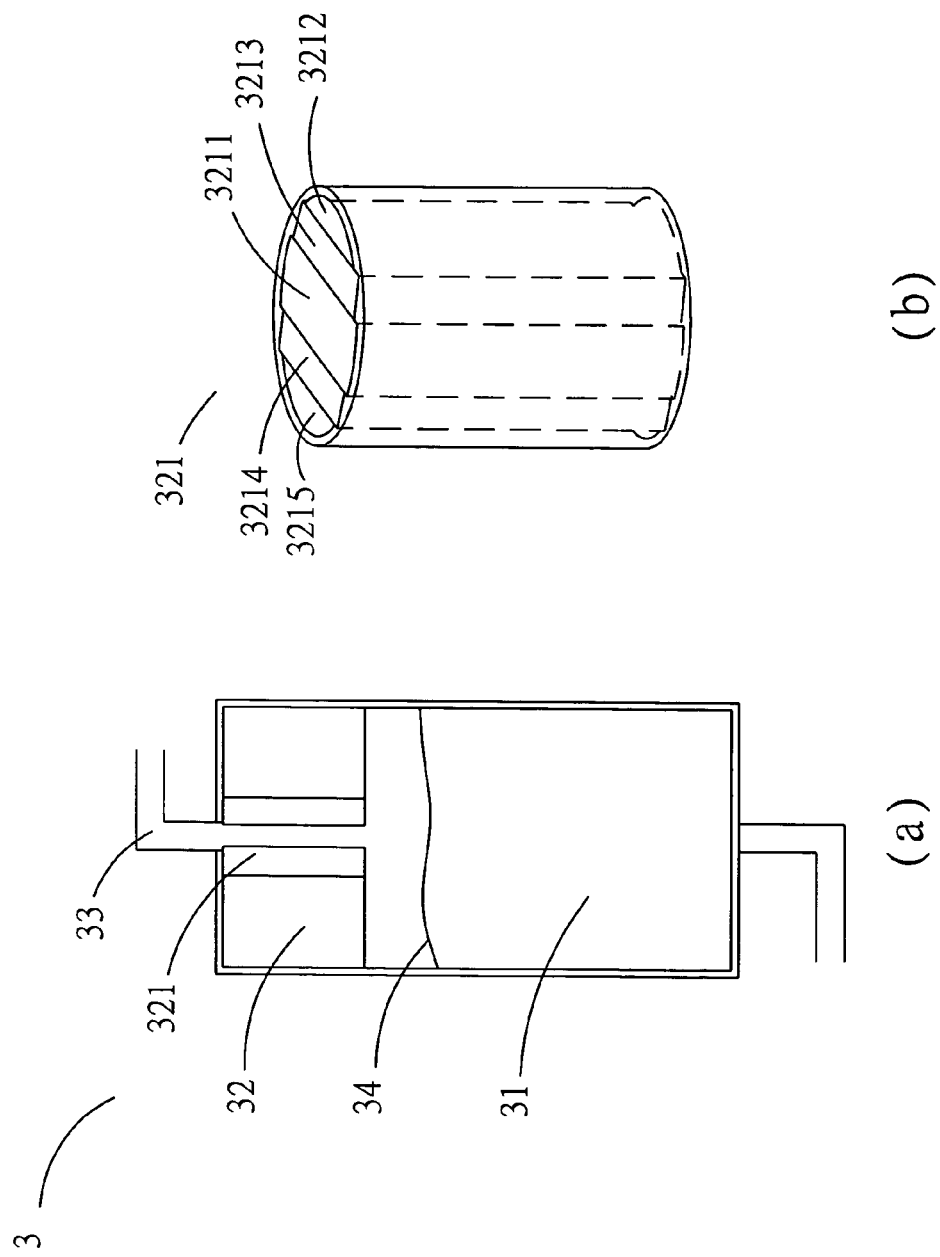
FIGS. 3(a), (b), (c) are exploded views of a third filtering bottle in accordance with the present invention.
Figure 3C:
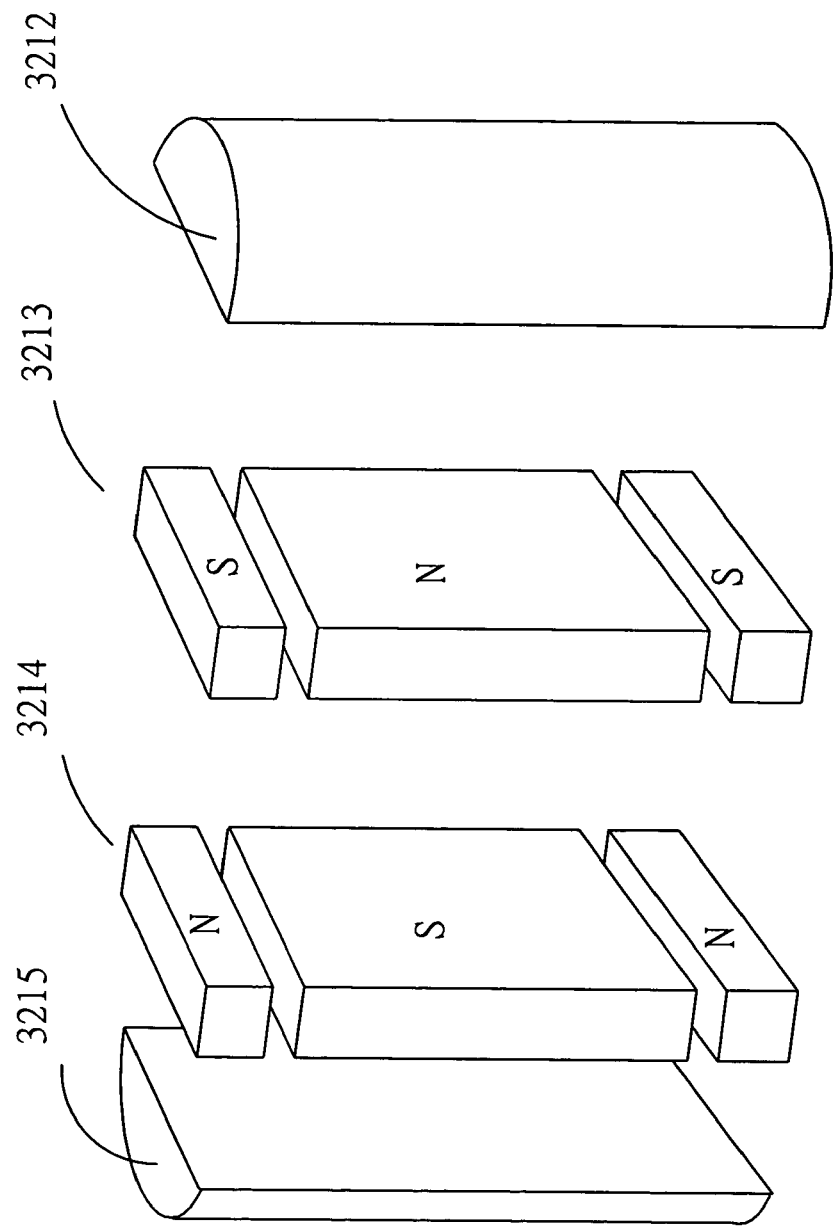

FIG. 3 (c) is an exploded view of the cuboid magnets 3213, 3214 and the semicircle iron posts 3212, 3215. The cuboid magnets 3213, 3214 are made of three magnets, the upper and the lower magnets are rod-shaped, and the middle magnet is cuboid-shaped. The magnetism of the three magnets of the cuboid magnet 3213 are S, N, S poles, and the three magnets of the cuboid magnet 3214 are N, S, N poles. The semicircle iron posts 3212, 3215 have no magnetism in order to expand the magnetic flux by guiding the magnetism of the cuboid magnets 3213, 3214, thereby the water can be magnetized easily when passing through.

Figure 4:
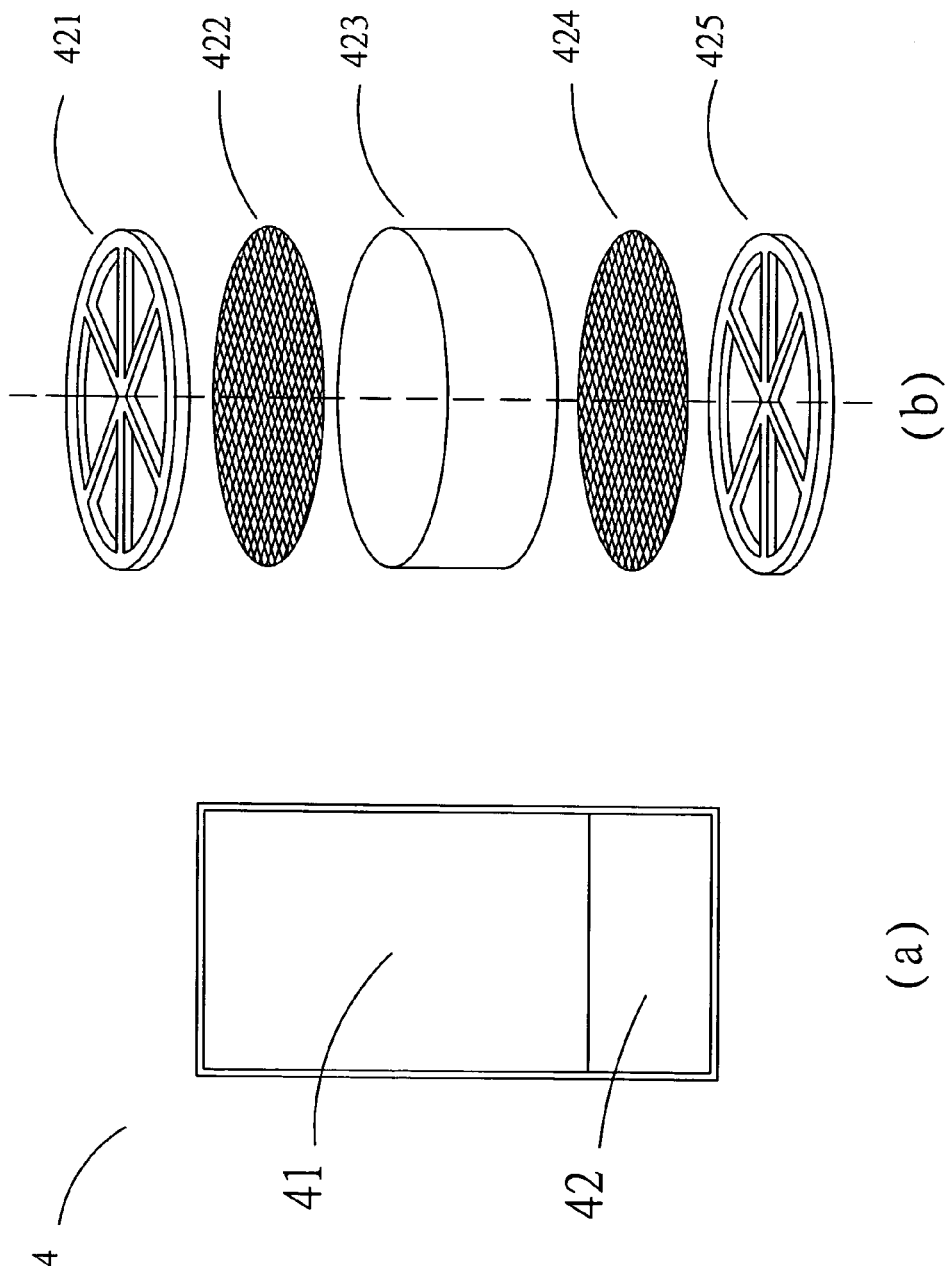
FIG. 4 is an exploded view of a fourth filtering bottle in accordance with the present invention.

The fourth filtering bottle 4 includes a compressed active carbon filtering core, and a special alloy of copper and zinc (sold under the trademark KDF 55) for filtering chlorine, chemical poisons, pesticides, heavy metal and the like. The fourth filtering bottle 4, as shown in FIG. 4(a), is divided into two layers. An upper layer 41 is filled with a compressed active carbon filtering core of coco shell fiber that contains silver elements for restraining bacteria. The lower layer is formed with a container 42 having a special powder of copper and zinc alloy.

FIG. 4(b) is an exploded view of the container 42, which comprises an upper meshed cover 421, a diaphragm 422, a cylinder 423, a diaphragm 424 and a lower meshed cover 425. The powder of copper and zinc alloy is disposed in the cylinder 423. The powder of copper and zinc alloy and the active carbon filtering core of coco shell fiber are usually not separated in the prior art devices, but which are purposely separated in the present invention. By such arrangement, water can contact the powder of copper and zinc alloy completely, thereby heavy metals such as mercury, lead and cadmium can be filtered thoroughly. Additionally, harmful substances such as chlorine and chemical organic poisons can be filtered effectively.

The arrangement of the third and fourth filtering bottles 3, 4 are opposite to that of the prior art. By this arrangement, water passing through the activated energy transformer of the third filtering bottle 3 is further filtered for chlorine, heavy metals, chemical poisons, chemical compounds, and bacteria as the water passes through the fourth filtering bottle 4.

The fifth filtering bottle 5 is a water-softener device having ion exchange resins for further filtering mineral substances in water such as calcium and magnesium by the characteristic of exchanging the positive and negative ions of resin. The filtered water that exits out from the tube 51 is provided for drinking after boiling. After boiling, the water will produce tea free from contamination from mineral substances, such as calcium carbonate and magnesium carbonate. Accordingly, the quality of tea and hot drinks is improved.

Figure 5:
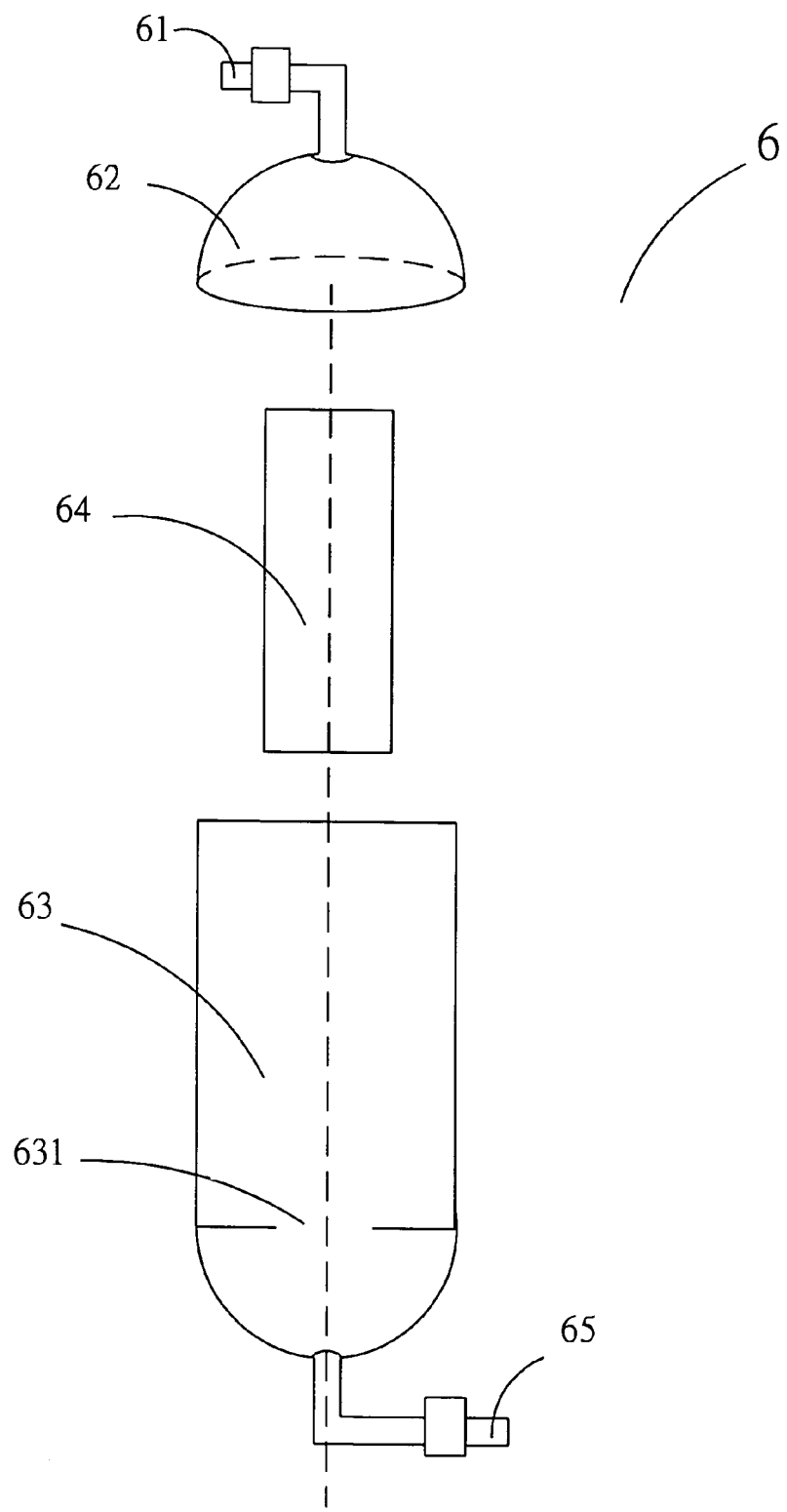
FIG. 5 is an exploded view of a sixth filtering bottle in accordance with the present invention.

The sixth filtering bottle 6 is disposed with a hollow silk film for filtering the remaining bacteria by its small opening (0.1 to 0.4.mu.m). The structure of the sixth filtering bottle 6 is shown in FIG. 5, which includes an inlet tube 61, a hemisphere-shaped cover 62, a cylinder 63, a hollow silk film tin 64 and an outlet tube 65.

The hemisphere-shaped cover 62 and the cylinder 63 are made of transparent materials, the upper end opening of the cylinder 63 engages (e.g., by screwing) with the hemisphere-shaped cover 62. In the lower end of the cylinder 63 is formed a hole 631, the hollow silk film tin 64 is disposed in the cylinder 63 for covering the hole 631, and the hollow silk film tin 64 is closely stuck to the hole 631 by using plastic material along the hole 631 in order to prevent leaking. Water is poured into the inlet tube 61 through the hollow silk film tin 64 and discharged from the outlet tube 65.

The hollow silk film tin 64 is formed with hollow silk films, each silk thread of the silk films is hollow and disposed in the hollow silk film tin 64 by means of rolling up. The bacteria can be filtered by the small opening (0.1 to 0.4 mu.m) of the silk threads, by a national standard in general, the bacteria are below 100 per c.c.

Water that is filtered by the hollow silk film tin 64 of the sixth filtering bottle 6 and discharged from the outlet tube 65 can be drank reassuringly.

The hollow silk film tin 64 of the sixth filtering bottle 6 and the hollow silk film therein can be replaced by a ceramic filtering core, so that the remaining bacteria can be filtered by the small opening of the ceramic filtering core.

While we have shown and described various embodiments in accordance with the present invention, it should be clear to those skilled in the art that further embodiments may be made without departing from the scope of the present invention.

What is claimed is:

1. A filter for drinking water, comprising:
a first filtering bottle, including a nonwoven filtering core;
a second filtering bottle, including a ceramic filtering core;
a third filtering bottle, including magnets and different kinds of minerals that can radiate far infrared;
a fourth filtering bottle, including an active carbon filtering core and an alloy of copper and zinc;
the first filtering bottle, the second filtering bottle, the third filtering bottle and the fourth filtering bottle are orderly in turns and connected by tubes, wherein water is poured into an inlet tube passes through the four filtering bottles and is discharged from an outlet tube for drinking,
wherein the third filtering bottle is divided into two layers, the water flows through the two layers, the lower layer is filled with the different kinds of minerals that can radiate far infrared in order to activate the water with far infrared energy, the minerals are maintained in the lower layer by a filtering net, the upper layer has a magnetic cylinder, a flowing water passage is formed in the middle of the magnetic cylinder, and a cuboid magnet and a semicircle iron post are disposed on each side of the flowing water passage and are wrapped by plastic materials.

2. The filter for drinking water as claimed in claim 1, wherein the cuboid magnet is made of three magnets, an upper and a lower magnet that are rod-shaped and a middle magnet that is cuboid-shaped, the magnetism of the three magnets of the respective cuboid magnet are S, N, S poles and N, S, N poles, the semicircle iron posts have no magnetism in order to expand the magnetic flux by guiding the magnetism of the cuboid magnets.

3. The filter for drinking water as claimed in claim 1 or 2, wherein the fourth filtering bottle is divided into two layers, the upper layer is filled with a compressed active carbon filtering core, and the lower layer is a container having a powder of the copper and zinc alloy.

4. The filter for drinking water as claimed in claim 3, wherein the container includes an upper meshed cover, a first diaphragm, a cylinder, a second diaphragm and a lower meshed cover, and the copper and zinc alloy powder is disposed in the cylinder.

5. The filter for drinking water as claimed in claim 1 or 2, wherein the fourth filtering bottle is connected with a fifth filtering bottle and a sixth filtering bottle by a three-way pipe, the fifth filtering bottle is formed with ion exchange resins, and water is poured into the first filtering bottle and discharged from the fifth or the sixth filtering bottle.

6. The filter for drinking water as claimed in claim 5, wherein the sixth filtering bottle is formed with a ceramic filtering core.

7. The filter for drinking water as claimed in claim 5, wherein the sixth filtering bottle is formed with a ceramic filtering core and includes an inlet tube, a hemisphere-shaped cover, a cylinder, and an outlet tube, an upper end opening of the cylinder is screwed to the hemisphere-shaped cover, and a hole is formed in the lower end of the cylinder.

* * * * *